United States Patent
Kang et al.

(10) Patent No.: US 7,360,229 B2
(45) Date of Patent: Apr. 15, 2008

(54) OPTICAL DISC CARTRIDGE AND APPARATUS HAVING A DISC FIXING/RELEASING MECHANISM FOR RECORDING OR REPRODUCING DATA

(75) Inventors: Seong-Taek Kang, Gyeonggi-Do (KR); Seung-Hon Yoo, Seoul (KR); Wae-Yeul Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 10/938,593

(22) Filed: Sep. 13, 2004

(65) Prior Publication Data

US 2005/0060737 A1 Mar. 17, 2005

(30) Foreign Application Priority Data

Sep. 15, 2003 (KR) .................... 10-2003-0063789
Sep. 15, 2003 (KR) .................... 10-2003-0063790

(51) Int. Cl.
*G11B 23/03* (2006.01)
(52) U.S. Cl. .................................... 720/734
(58) Field of Classification Search ............... 720/734, 720/732, 735, 737, 738, 739, 740, 742, 718
See application file for complete search history.

(56) References Cited

U.S. PATENT DOCUMENTS

2004/0052204 A1* 3/2004 Okazawa et al. ........... 369/291
2004/0163099 A1* 8/2004 Hashizume et al. ........ 720/738

* cited by examiner

*Primary Examiner*—Julie Anne Watko
(74) *Attorney, Agent, or Firm*—Birch, Stewart, Kolasch & Birch, LLP (57) ABSTRACT

Disclosed is an optical disc cartridge comprising: a casing having a disc inserting/opening part for inserting and taking out a disc at an upper surface thereof and having an access hole to which an optical pickup accesses at a lower surface thereof; a pair of shutters mounted in the casing, for opening and closing the access hole and contact-supporting a disc at two points or at one point; a rotation wheel rotatably coupled to the shutters, for moving the shutters and placing an optical disc thereon; a wheel fixing/releasing means mounted at an inner side of the casing, for fixing or releasing the rotation wheel; and a disc fixing/releasing means movably mounted at the casing, for controlling a size of the disc inserting/opening part and thereby limiting an insertion/takeout of an optical disc into/from the disc inputting opening, and an apparatus of recording or reproducing data on or from an optical disc, comprising:
a driving unit rotating an optical disc inserted in the optical disc cartridge; and a recording or reproducing unit recording or reproducing data on or from the optical disc.

21 Claims, 10 Drawing Sheets

OPTICAL DISC CARTRIDGE AND APPARATUS HAVING A DISC FIXING/RELEASING MECHANISM FOR RECORDING OR REPRODUCING DATA

This Non-provisional application claims priority under 35 U.S.C. §119(a) on Patent Application No(s). 10-2003-0063789 and 10-2003-0063790 filed in Korea, Republic of on Sep. 15, 2003, the entire contents of which are hereby incorporated by reference.

BACKGROUND OF THE INVENTION

1. Field of the Invention

The present invention relates to an optical disc cartridge, and more particularly, to an optical disc cartridge capable of facilitating accommodating an optical disc into a cartridge or taking out the accommodated optical disc from the cartridge when the optical disc is directly inserted into a disc recording and/or reproducing apparatus or the cartridge in which the optical disc is accommodated is inserted into the disc recording and/or reproducing apparatus in order to record information on the optical disc or reproduce the recorded information, and to the recording and/or reproducing apparatus.

2. Description of the Conventional Art

As a DVD technique is developed, a disc for recording and reproducing information is being densified. The densified disc or an important disc is used with being accommodated in a cartridge for a safe protection of data.

Figure 1:
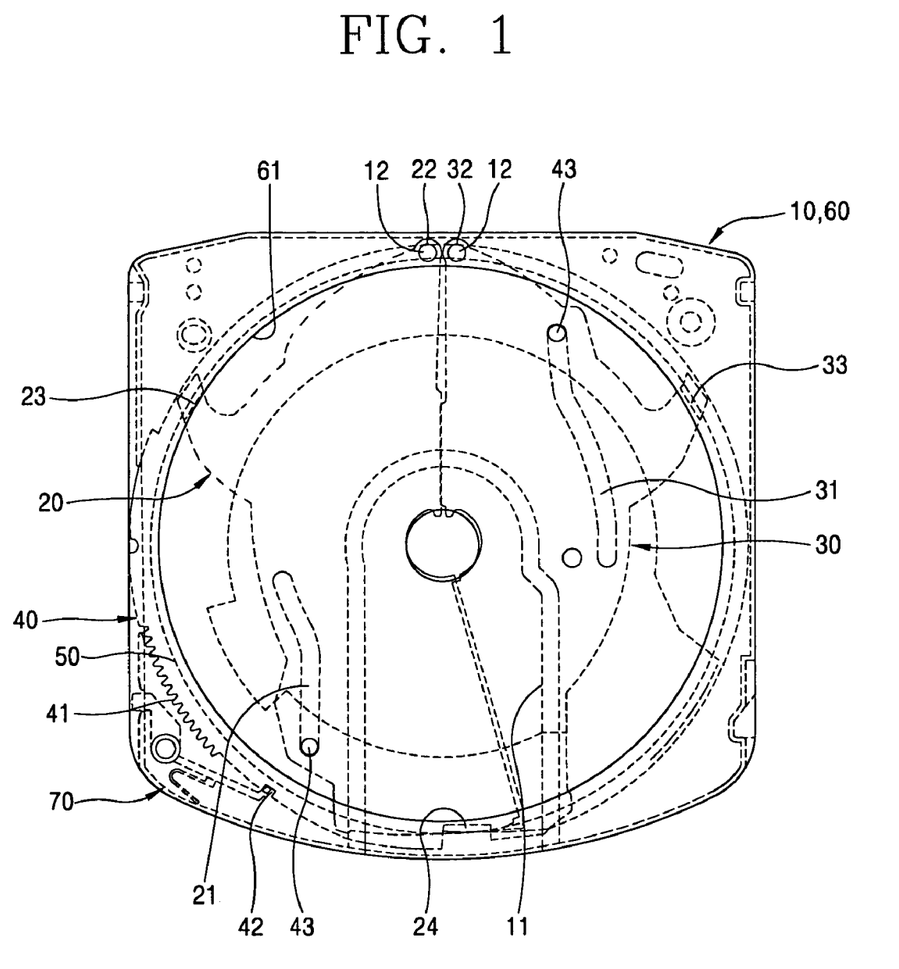
FIG. 1 is a plane view showing an optical disc cartridge in accordance with the conventional art.
Figure 2:
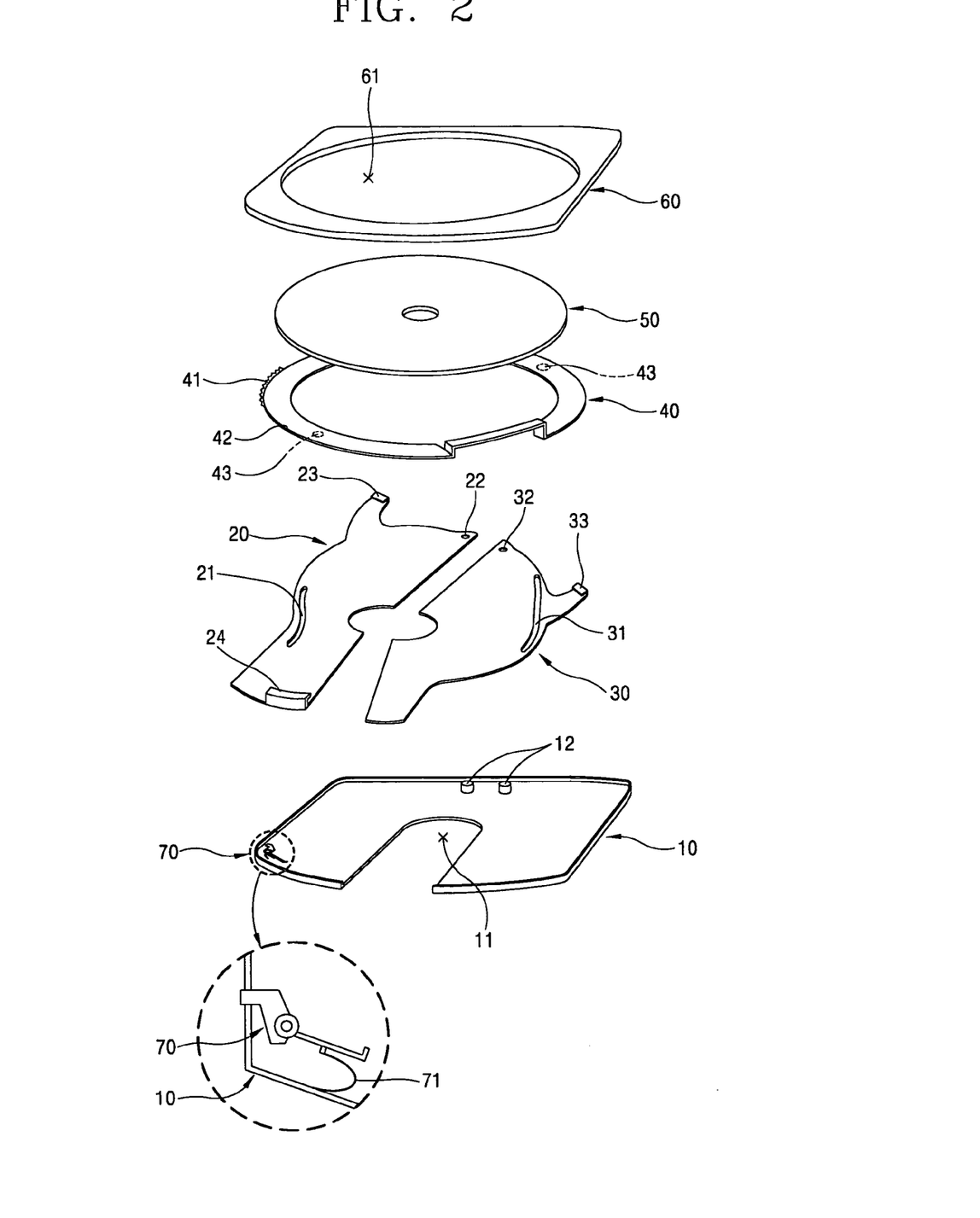
FIG. 2 is a disassembled perspective view showing the optical disc cartridge in accordance with the conventional art.

FIG. 1 is a disassembled perspective view showing an optical disc cartridge used for a blue-ray disc in accordance with the conventional art.

As shown, the optical disc cartridge comprises: a lower case 10 having an access hole 11 to which an optical pickup accesses at a lower surface thereof; a pair of left and right shutters 20 and 30 hinge-coupled to the lower case 10, for opening and closing the access hole 11; a rotation wheel 40 coupled to the pair of shutters 20 and 30, for opening and closing the pair of shutters 20 and 30; an optical disc 50 mounted on the rotation wheel 40; an upper case 60 having a viewing hole 61, coupled to the lower case 10, and covering the pair of shutters 20 and 30, the rotation wheel 40, the optical disc 50, etc.; a latch 70 mounted at an edge of the lower case 10, for fixing and releasing the rotation wheel 40.

The lower case 10 is formed as a square plate, and is provided with the access hole 11 penetratingly-formed with a certain shape at one side thereof. Two bosses 12 for hinge-coupling the left and right shutters 20 and 30 are protruded at one side of the lower case.

The left shutter 20 is provided with a cam groove 21 of a certain shape at a plate of a certain shape, and a hinge hole 22 for inserting the boss 12 is formed at one side of the plate. A first fixing protrusion 23 is formed at a lateral position of the hinge hole 22, and a second fixing protrusion 24 is formed at an opposite position of the hinge hole 22.

The right shutter 30 is provided with a cam groove 31 of a certain shape at a plate of a certain shape, and a hinge hole 32 for inserting the boss 12 is formed at one side of the plate. A first fixing protrusion 33 is formed at a lateral position of the hinge hole 32.

The left shutter 20 and the right shutter 30 are coupled to the lower case 10 so that the hinge holes 22 and 32 can be rotatably inserted into the bosses 12 of the lower case 10, respectively.

The rotation wheel 40 is formed as a ring shape, and a plurality of gear portions 41 are formed at an outer circumferential surface of one side of the rotation wheel 40. A fixing groove 42 for inserting the latch 70 is formed near the gear portions 41. Also, cam protrusions 43 inserted into the cam groove 21 of the left shutter and the cam groove 31 of the right shutter are formed at one surface of the rotation wheel 40. The rotation wheel 40 is positioned on the left shutter 20 and the right shutter 30 so that the cam protrusions 43 can be respectively inserted into the cam grooves 21 and 31 of the left and right shutters.

The optical disc is positioned on the rotation wheel 40.

The latch 70 is rotatably coupled to one side edge of the lower case 10, and one side thereof is protruded to outside of the lower case 10. The latch 70 is provided with an elastic portion 71 supported at a lateral wall of the lower case 10. One side of the latch 70 is inserted into the fixing groove 42 of the rotation wheel 40 in a state that the left shutter 20 and the right shutter 30 close the access hole 11 of the lower case, thereby fixing the rotation wheel 40.

The upper case 60 is formed as a square shape corresponding to the lower case 10, and is provided with a viewing hole 61 having an inner diameter smaller than an outer diameter of the optical disc 50 therein.

The lower case 10 and the upper case 60 are coupled to each other by a plurality of screws (not shown).

Operation of the optical disc cartridge will be explained as follows.

In the optical disc cartridge, information is recorded on the optical disc 50 positioned on the optical disc cartridge or reproduced by a disc recording and/or reproducing apparatus. Before the optical disc cartridge is inserted into the disc recording and/or reproducing apparatus, the left shutter 20 and the right shutter 30 are in a state of closing the access hole 11 of the lower case, and a part of the latch 70 is inserted into the fixing groove 42 of the rotation wheel 40 thus to prevent the rotation wheel 40 from being rotated.

In the state that the left shutter 20 and the right shutter 30 close the access hole 11, the first fixing protrusions 23 and 33 of the left and right shutters 20 and 30 and the second fixing protrusion 24 of the let shutter 20 press an upper surface of the optical disc 50 thereby to fix the optical disc 50.

As the upper surface of the optical disc 50 is pressed at three points by the first and second fixing protrusions 23 and 33 of the left and right shutters 20 and 30 and the second fixing protrusion 24 of the left shutter 20, foreign materials such as dust, etc. are prevented from being introduced into a recording surface of the optical disc 50 and the recording surface of the optical disc are prevented from being damaged when vibration is applied thereto.

When the optical disc cartridge is inserted into the disc recording and/or reproducing apparatus, a part of the latch 70 protruded to outside of the lower case 10 is pressed and the latch 70 is angle-rotated. According to this, a part of the latch 70 is detached from the fixing groove 42. Also, as a rack (not shown) provided at the disc recording and/or reproducing apparatus moves with being engaged with the gear portions 41 of the rotation wheel, the rotation wheel 40 is rotated and thereby the cam protrusions 43 of the rotation wheel are respectively moved along the cam grooves 21 and 31 of the left and right shutters.

As the cam protrusions 43 of the rotation wheel 40 are respectively moved along the cam grooves 21 and 31 of the left and right shutters, the left and right shutters 20 and 30 are respectively rotated centering around the bosses 12 of the lower case serving as a hinge axis. According to this, the access hole 11 of the lower case is opened, and the first fixing protrusions 23 and 33 and the second fixing protrusion 24 releases the supporting of the optical disc 50.

The optical pickup of the disc recording and/or reproducing apparatus accesses to the recording surface of the optical disc through the access hole 11 thereby to reproduce or record data.

An optical disc of a high density can be used with being accommodated in a cartridge, and can be directly inserted into a disc recording and/or reproducing apparatus without being accommodated in the cartridge thus to reproduce and record information as a disc reproducing technique is developed. In the latter case, the optical disc has to be easily accommodated in the cartridge or the accommodated optical disc has to be easily taken out from the cartridge.

However, in the conventional optical disc cartridge, when the optical disc 50 is accommodated in the cartridge or the accommodated optical disc is taken out from the cartridge, a plurality of screws have to be engaged to the upper case 60 and the lower case 10 or the engaged screws have to be released. According to this, it is complicated to accommodate the optical disc 50 in the cartridge or to take out the accommodated optical disc from the cartridge, and an additional tool has to be used.

Also, when the optical disc is accommodated in the cartridge or the accommodated optical disc is taken out from the cartridge, the left and right shutters 20 and 30 are moved by rotating the rotation wheel 40 and thereby the fixing protrusions 23, 24, and 33 of the left and right shutters 20 and 30 fixedly-support or release the optical disc. According to this, the process for accommodating the optical disc in the cartridge or taking out the accommodated optical disc becomes more complicated and difficult.

SUMMARY OF THE INVENTION

Therefore, an object of the present invention is to provide an optical disc cartridge capable of facilitating accommodating an optical disc into a cartridge or taking out the accommodated optical disc from the cartridge when the optical disc is directly inserted into a disc recording and/or reproducing apparatus or the cartridge in which the optical disc is accommodated is inserted into the disc recording and/or reproducing apparatus in order to record information on the optical disc or reproduce the recorded information.

Another object of the present invention is to provide an optical disc cartridge capable of facilitating accommodating an optical disc in a cartridge or taking out the accommodated optical disc from the cartridge without moving a pair of shutters.

Another object of the present invention is to provide the disc recording and/or reproducing apparatus in order to recording or reproduce information on or from the disc inserted in the optical disc cartridge.

To achieve these and other advantages and in accordance with the purpose of the present invention, as embodied and broadly described herein, there is provided an optical disc cartridge comprising: a casing having a disc inserting/opening part for inserting/taking out a disc therein/therefrom at an upper surface thereof and having an access hole to which an optical pickup accesses at a lower surface thereof; a pair of shutters mounted in the casing, for opening and closing the access hole and contact-supporting a disc at one point or at two points; a rotation wheel rotatably coupled to the shutters, for moving the shutters and placing an optical disc thereon; a wheel fixing/releasing means mounted at an inner side of the casing, for fixing or releasing the rotation wheel; and a disc fixing/releasing means movably mounted at the casing, for controlling a size of the disc inserting/opening part_and thereby limiting an insertion/takeout of an optical disc.

To achieve these and other advantages and in accordance with the purpose of the present invention, as embodied and broadly described herein, there is provided an apparatus of recording or reproducing data on or from an optical disc, comprising: a driving unit rotating an optical disc inserted in the optical disc cartridge; and a recording or reproducing unit recording or reproducing data on or from the optical disc.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
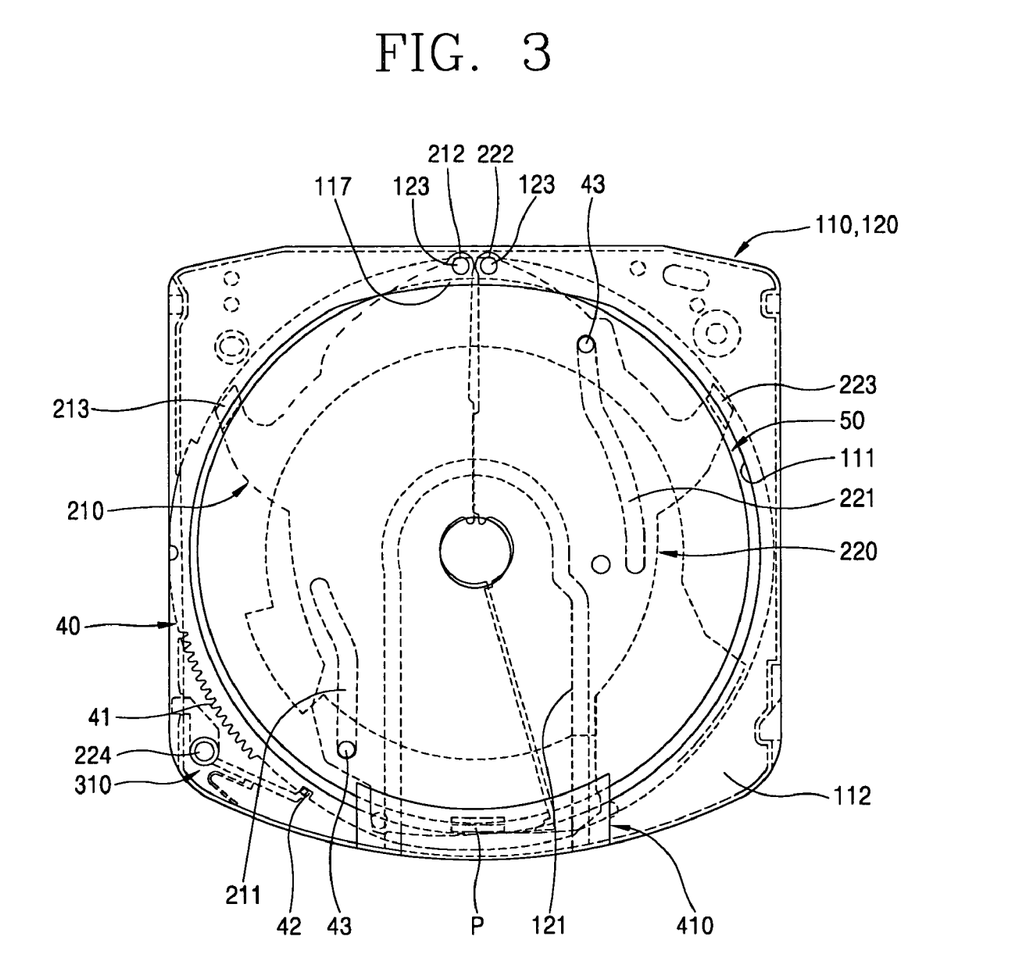
FIGS. 3 and 4 are respectively a plane view and a disassembled perspective view showing an optical disc cartridge according to one embodiment of the present invention.
Figure 4:
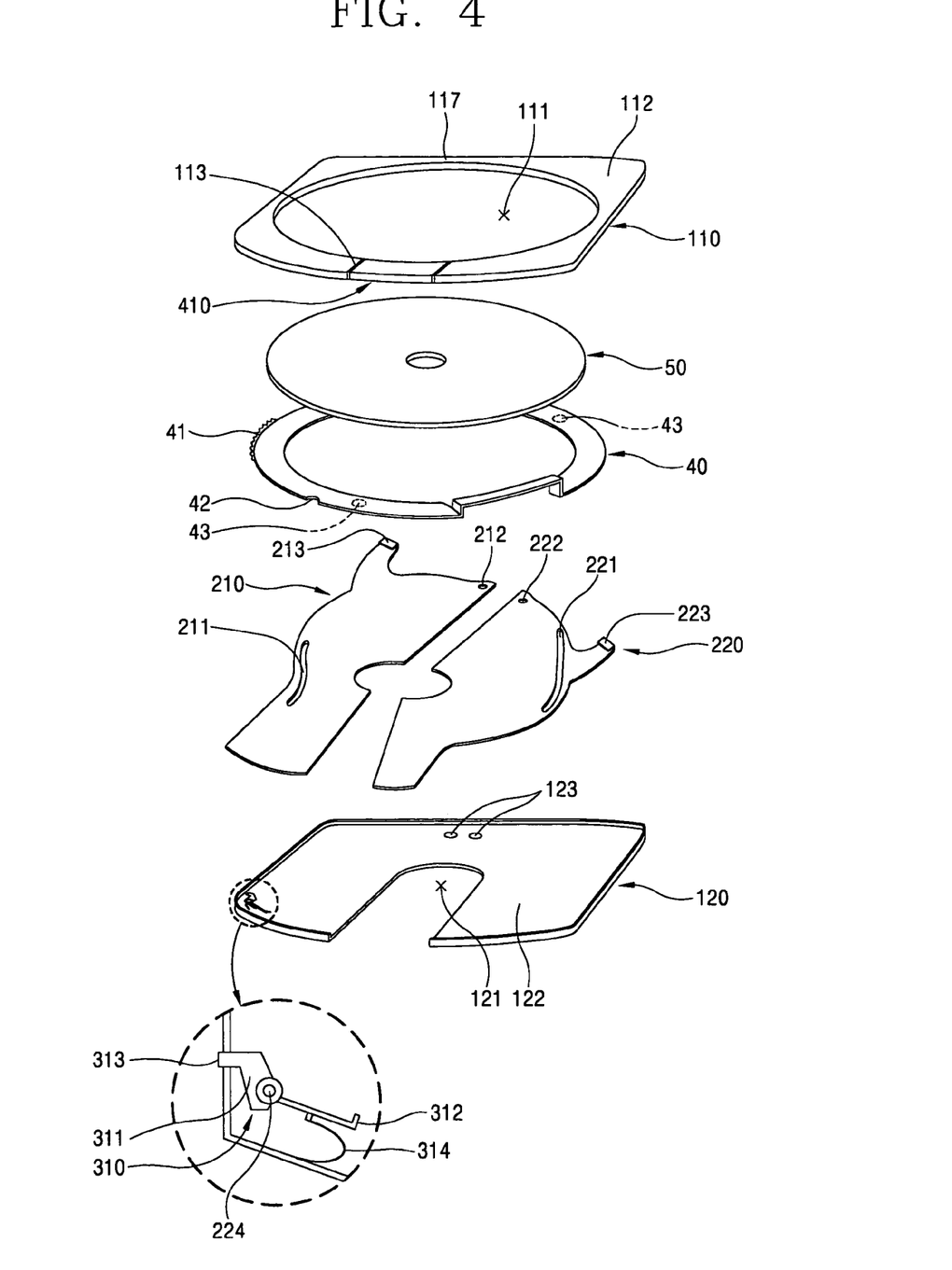
Figure 5:
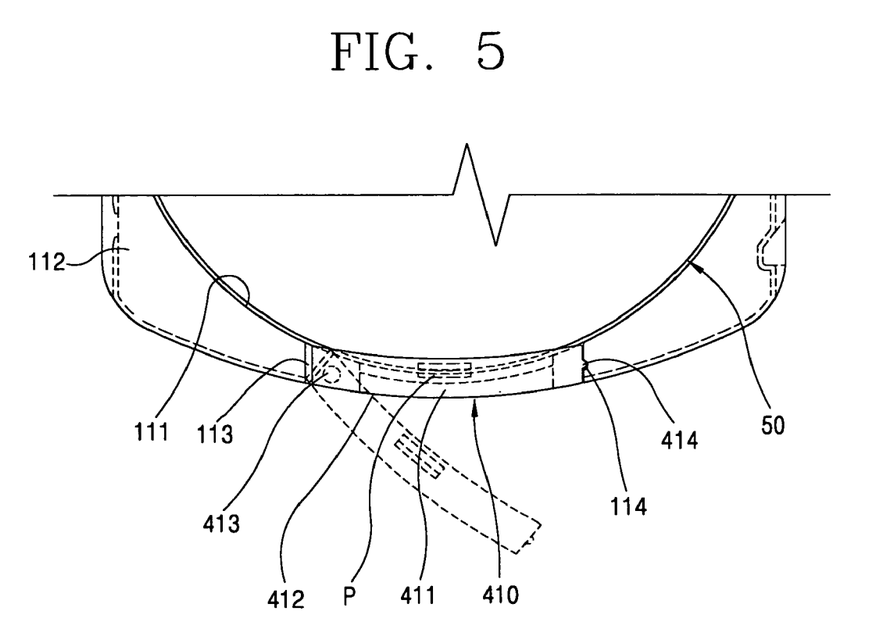
FIGS. 5 and 6 are plane views respectively showing a disc fixing/releasing means of the optical disc cartridge according to the present invention and a modification example of the disc fixing/releasing means.

FIGS. 3 and 4 are respectively a plane view and a disassembled perspective view showing an optical disc cartridge according to one embodiment of the present invention, and FIG. 5 is a plane views showing the optical disc cartridge by an enlargement. The same reference numerals were given to the same parts as those of the conventional art.

As shown, an optical disc cartridge according to the present invention comprises: a casing having a disc inserting/opening part 111 for inserting/taking out a disc therein/ therefrom at an upper surface thereof and having an access hole 121 to which an optical pickup accesses at a lower surface thereof; a pair of shutters 210 and 220 mounted in the casing, for opening and closing the access hole 121 and contact-supporting an optical disc at two points; a rotation wheel 40 rotatably coupled to the shutters 210 and 220, for moving the shutters 210 and 220 and placing an optical disc thereon; a wheel fixing/releasing means mounted at an inner side of the casing, for fixing or releasing the rotation wheel 40; and a disc fixing/releasing means movably mounted at the casing, for controlling a size of the disc inserting/opening part 111 and thereby limiting an insertion/takeout of an optical disc into/from the disc inserting/opening part 111.

In order to decrease a size of the disc inserting/opening part 111 as the disc fixing/releasing means moves towards the disc inserting/opening part 111, the disc fixing/releasing means is provided with a supporting protrusion P for supporting an optical disc.

The casing is composed of: an upper case 110 having the disc inserting/opening part 111 of a certain inner diameter therein; a lower case 120 formed to be corresponding to the upper case 110, having the access hole 121 at one side thereof, and coupled to the upper case 110.

In the lower case 120, the access hole 121 of a certain shape is formed at one side of a plate portion 122 of a square shape, and two bosses 123 for hinge-coupling the pair of shutters 210 and 220 are protruded at one surface of the plate portion 122. The bosses 123 are positioned at an opposite side of the access hole 121.

In the upper case 110, the disc inserting/opening part 111 having an inner diameter larger than an outer diameter of the optical disc 50 is formed at a plate portion 112 formed as a square shape corresponding to the lower case 120, and a guide groove 113 where the disc fixing/releasing means is to be positioned is formed at one side of the plate portion 112. The inner diameter of the disc inserting/opening part is formed to be larger than the outer diameter of the optical disc 50, and the guide groove 113 has a certain area and depth. A stopping region 117 having a curvature radius larger than that of the disc inserting/opening part 111 is formed at one side of disc inserting/opening part 111.

The upper case 110 and the lower case 120 are coupled to each other by a plurality of screws (not shown).

The pair of shutters 210 and 220 are composed of a left shutter 210 and a right shutter 220. The left shutter 210 includes: a cam groove 211 of a certain shape formed at a plate of a certain shape; a hinge hole 212 formed at one side of the plate and inserting the boss 123; and a fixing protrusion 213 formed at a lateral portion of the hinge hole 212. The left shutter 210 of the present invention is different from the conventional left shutter 20 in that the second fixing protrusion 24 is not provided.

The right shutter 220 includes: a cam groove 221 of a certain shape formed at a plate of a certain shape; a hinge hole 222 formed at one side of the plate and inserting the boss 123; and a fixing protrusion 223 formed at a lateral portion of the hinge hole 222.

The left shutter 210 and the right shutter 220 are coupled to the lower case 120 so that the bosses 123 of the lower case 120 can be respectively inserted into the hinge holes 212 and 222.

The rotation wheel 40 is formed as the same structure as the conventional one, and its detail explanation will be omitted. The rotation wheel 40 is positioned on the left shutter 210 and the right shutter 220 so that the cam protrusions 43 can be respectively inserted into the cam grooves 211 and 221 of the left and right shutters 210 and 220.

The optical disc 50 is positioned on the rotation wheel 40.

The wheel fixing/releasing means is composed of: a fixing pin portion 224 protruded at one edge of the lower case 120 with a certain height; and a latch 310 rotatably inserted into the fixing pin portion 224. The latch 310 is composed of: a body portion 311 formed as a certain shape and having a penetration hole for inserting the fixing pin portion 224 therein; a stopping portion 312 extended at one side of the body portion 311 and inserted into the fixing groove 42 of the rotation wheel 40 thus to be hooked; a pressing portion 313 extended at another side of the body portion 311; and an elastic portion 314 curvedly-extended at one side of the stopping portion 312.

The stopping portion 312 of the latch 310 is inserted into the fixing groove 42 of the rotation wheel 40 in a state that the left shutter 210 and the right shutter 220 close the access hole 121 of the lower case. At this time, the pressing portion 313 of the latch is protruded to outside of the lower case 120. As the stopping portion 312 of the latch is inserted into the fixing groove 42 of the rotation wheel 40, the latch 310 fixes the rotation wheel 40.

The disc fixing/releasing means is provided at the upper case 110 so as to be positioned at a side where the access hole 121 is formed.

The disc fixing/releasing means is composed of: a hinge type overlapping member 410 hinge-coupled to an upper surface of the casing, angle-rotated in a horizontal direction of the casing centering around a hinge axis thus to be overlapped with the disc inserting/opening part 111, for decreasing a size of the disc inserting/opening part 111; a supporting protrusion P protruded at a lower surface of the hinge type overlapping member 410; and an attachment/detachment means for attaching/detaching another side of the hinge type overlapping member 410 to/from the casing.

The hinge type overlapping member 410 is composed of: a horizontal portion 411 formed as a square shape having a certain thickness; a vertical portion 412 curvedly-extended at one side of the horizontal portion 411 to have a certain area; a hinge axis portion 413 protruded at one side of a lower surface of the horizontal portion 411 and rotatably coupled to the upper case 110; and a supporting protrusion P protruded at the middle part of the lower surface of the horizontal portion 411. One surface of the horizontal portion 411 is formed as a curved line having a curvature radius greater than that of the disc inserting/opening part 111. An inclination surface is formed at the end of the supporting protrusion P.

The horizontal portion 411 of the hinge type overlapping member 410 is positioned at the guide groove 113 of the upper case 110.

The attachment/detachment means is composed of: a detachable protrusion 414 formed at one side of the hinge type overlapping member 410; and an attachment/detachment groove 114 formed at one side wall of the guide groove of the upper case, for attaching/detaching the detachable protrusion 414 thereto/therefrom.

Operation of the disc fixing/releasing means will be explained in brief.

When one side of the hinge type overlapping member 410 is pulled, the hinge type overlapping member 410 is angle-rotated centering around the hinge axis portion 413 and thereby the overlapping of the hinge type overlapping member 410 with the disc inserting/opening part 111 is released.

When the hinge type overlapping member 410 is pushed in a reverse direction, the hinge type overlapping member 410 is rotated centering around the hinge axis portion 413 and is fixed to the upper case 110 by the attachment/detachment means. At this time, the hinge type overlapping member 410 is overlapped with the disc inserting/opening part 111 thus to make a size of the disc inserting/opening part 111 small. At the same time, the supporting protrusion P formed at the lower surface of the horizontal portion 411 of the hinge type overlapping member slidably contact-supports the optical disc 50 positioned in the casing.

Figure 6:
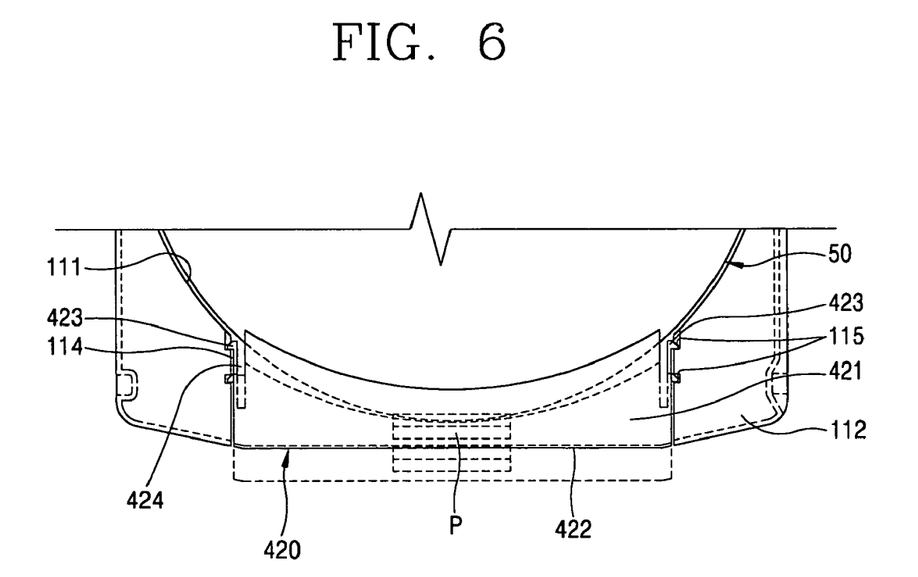

FIG. 6 shows a modification example of the disc fixing/releasing means. As shown, the disc fixing/releasing means includes: a reciprocating type overlapping member 420 reciprocably coupled to the upper surface of the casing in a direction towards the disc inserting/opening part 111 thus to be overlapped with the disc inserting/opening part 111, for decreasing a size of the disc inserting/opening part 111; a supporting protrusion P protruded at a lower surface of the reciprocating type overlapping member 420; and a position limiting means for limiting a reciprocation distance of the reciprocating type overlapping member 420.

The reciprocating type overlapping member 420 is composed of: a horizontal portion 421 formed as a square shape having a certain thickness; a vertical portion 422 curvedly-extended at one side of the horizontal portion 421 to have a certain area; and a supporting protrusion P protruded at the middle part of a lower surface of the horizontal portion 421. One surface of the horizontal portion 421 is formed as a curved line having a curvature radius greater than that of the disc inserting/opening part 111. An inclination surface is formed at the end of the supporting protrusion P.

The horizontal portion 421 of the reciprocating type overlapping member 420 is slidably inserted into the guide groove 113 of the upper case 110. The guide groove 113 is provided with a groove for preventing a separation of the horizontal portion 421 at both inner lateral surfaces thereof. A space (not shown) where the supporting protrusion P of the reciprocating type overlapping member moves is provided in the guide groove 113.

The position limiting means is composed of: attachment/detachment grooves 115 formed at both lateral surfaces of the guide groove 113 as a pair, respectively; and a detachable protrusions 423 protruded at both lateral walls of the reciprocating type overlapping member 420 thus to be attached/detached to/from the attachment/detachment groove 115. A slit 424 for facilitating the attachment/detachment of the detachable protrusion 423 is preferably formed at the horizontal portion 421 of the reciprocating type overlapping member positioned at a lateral portion of the detachable protrusion 423.

Operation of the disc fixing/releasing means will be explained in brief.

When the reciprocating type overlapping member 420 is pulled along a direction spaced from the disc inserting/opening part 111, the reciprocating type overlapping member 420 is moved along the guide groove 113 and thereby the overlapping of the reciprocating type overlapping member with the disc inserting/opening part 111 is released. At this time, the detachable protrusion 423 formed at the reciprocating type overlapping member 420 is moved from the attachment/detachment groove 115 positioned at the disc inserting/opening part 111 to another attachment/detachment groove 115 positioned at a lateral portion of the disc inserting/opening part 111.

Also, when the reciprocating type overlapping member 420 is pushed towards the disc inserting/opening part 111, the reciprocating type overlapping member 420 is moved along the guide groove 113 and thereby overlaps a part of the disc inserting/opening part 111. At the same time, the supporting protrusion P formed at the lower surface of the horizontal portion 421 supports the optical disc 50 positioned in the casing.

Figure 7:
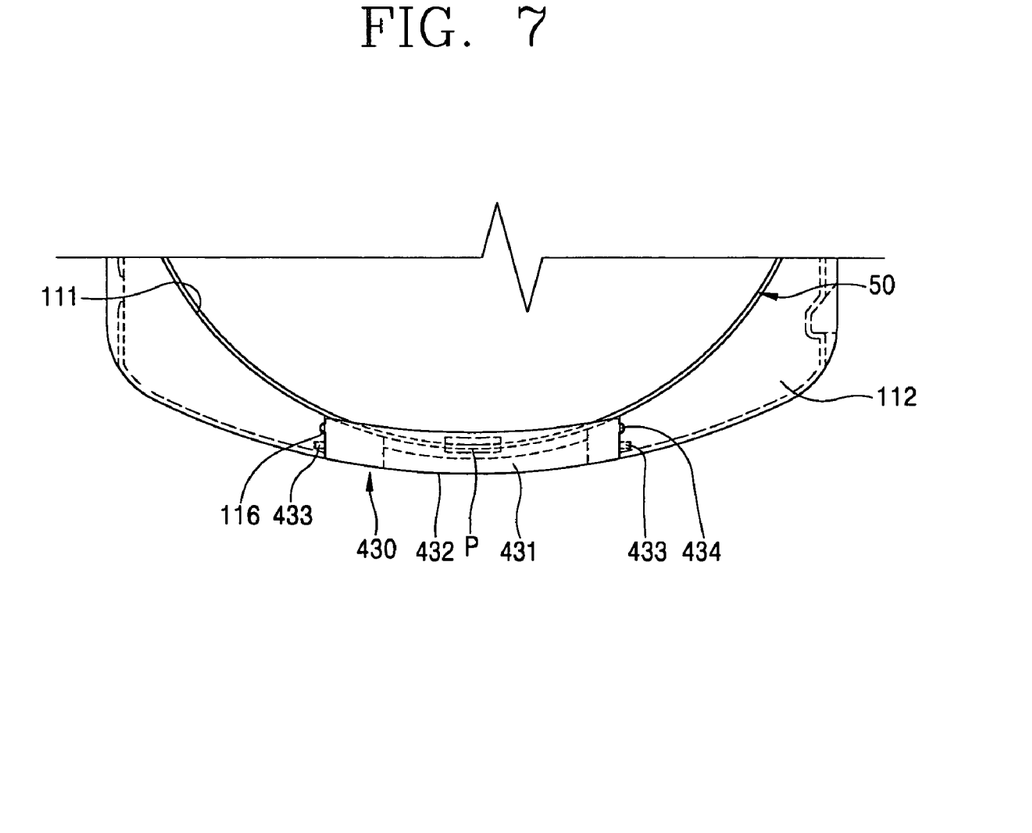
FIG. 7 is a plane view showing another modification example of the disc fixing/releasing means.
Figure 8:
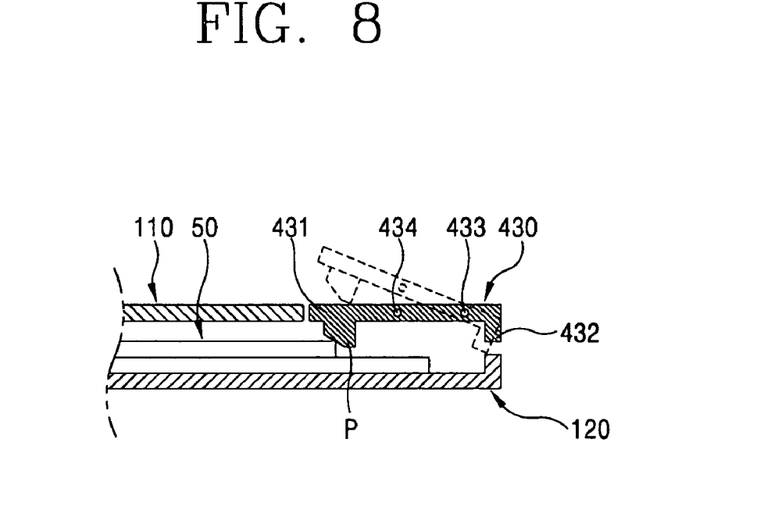
FIG. 8 is a lateral section view of the disc fixing/releasing means.

FIGS. 7 and 8 are other modification examples of the disc fixing/releasing means. As shown, the disc fixing/releasing means is composed of: a rotary type overlapping member 430 hinge-coupled to the casing, angle-rotated in a vertical direction of the casing centering around a hinge axis thus to be overlapped with the disc inserting/opening part 111, for decreasing a size of the disc inserting/opening part 111; a supporting protrusion P protruded at a lower surface of the rotary type overlapping member 430; and an attachment/detachment means for attaching/detaching another side of the rotary type overlapping member 430 to/from the casing.

The rotary type overlapping member 430 is composed of: a horizontal portion 431 formed as a square shape having a certain thickness; a vertical portion 432 curvedly-extended at one side of the horizontal portion 431 to have a certain area; a supporting protrusion P protruded at the middle part of the lower surface of the horizontal portion 431; and axial portions 433 protruded at both lateral surfaces of the horizontal portion.

The horizontal portion 431 of the rotary type overlapping member 430 is positioned at the guide groove 113 of the upper case 110, and the axial portions 433 formed at the horizontal portion 431 are rotatably inserted into insertion grooves formed at both lateral surfaces of the guide groove 113, respectively.

One surface of the horizontal portion 431 is formed as a curved line having a curvature radius greater than that of the disc inserting/opening part 111. An inclination surface is formed at the end of the supporting protrusion P.

The attachment/detachment means is composed of: an attachment/detachment groove 116 formed at both lateral walls of the guide groove 113 of the upper case; and a detachable protrusion 434 protruded at both lateral surfaces of the horizontal portion of the rotary type overlapping member 430 thus to be attached/detached to/from the attachment/detachment groove 116. The detachable protrusion 434 is formed with a certain interval from the axial portion 433.

Operation of the disc fixing/releasing means will be explained in brief.

When an edge of the rotary type overlapping member 430 is pressed, the rotary type overlapping member 430 is angle-rotated centering around the axial portion 433 and thereby the overlapping of the rotary type overlapping member 430 with the disc inserting/opening part 111 is released. Then, the horizontal portion 431 of the rotary type overlapping member 430 is pressed, the rotary type overlapping member 430 is angle-rotated thus to be positioned at the guide groove 113 of the upper case. According to this, the rotary type overlapping member 430 is overlapped with the disc inserting/opening part 111, and the supporting protrusion P formed at the horizontal portion supports the optical disc 50.

Operation of the optical disc cartridge according to one embodiment of the present invention will be explained as follows.

In the optical disc cartridge of the present invention, differently from the conventional art in which the left shutter 210 and the right shutter 220 are moved by rotating the rotation wheel 40 in order to accommodate the optical disc 50 in the casing or to take out the accommodated optical disc 50 from the casing, the optical disc 50 is accommodated in the casing or the accommodated optical disc 50 is taken out from the casing in a state that the left shutter 210 and the right shutter 220 close the access hole 121.

In case of accommodating the optical disc in the casing, the disc fixing/releasing means is moved thus to release the overlapping of the disc fixing/releasing means with the disc inserting/opening part 111 of the casing. Then, the optical disc is inserted into the casing through the disc inserting/opening part 111 thus to be positioned on the rotation wheel 40. The optical disc is positioned on the rotation wheel 40 by being inserted between the fixing protrusions 213 and 223 of the left and right shutters 210 and 220 and the upper surface of the rotation wheel 40.

Then, the disc fixing/releasing means is moved towards the disc inserting/opening part 111 thus to overlap the disc inserting/opening part 111 of the casing, and at the same time, the supporting protrusion P of the disc fixing/releasing means supports one side of the optical disc 50. The optical disc accommodated in the casing are supported at three points by the fixing protrusions 213 and 223 of the left and right shutters 210 and 220 and the supporting protrusion P of the disc fixing/releasing means. Also, under a state that the fixing of the optical disc by the fixing protrusions is released by a user's carelessness, when the optical disc cartridge is moved, the disc fixing/releasing means is overlapped with the disc inserting/opening part 111 and thereby the size of the disc inserting/opening part 111 becomes small. According to this, the optical disc 50 is prevented from being detached from the casing through the disc inserting/opening part 111.

Also, in case of taking out the optical disc accommodated in the casing, the disc fixing/releasing means is moved in a direction spaced from the disc inserting/opening part 111. According to this, the overlapping of the disc fixing/releasing means with the disc inserting/opening part 111 is released, and the supporting protrusion P of the disc fixing/releasing means releases the supported state of the optical disc. Under said state, the user takes out the optical disc positioned on the rotation wheel 40 inside the casing through the disc inserting/opening part 111. That is, the optical disc positioned between the fixing protrusions 213 and 223 of the left and right shutters 210 and 220 and the upper surface of the rotation wheel 40 is taken out from the casing.

In case of recording information in the optical disc or reproducing the information by using a disc recording and/or reproducing apparatus, the optical disc can be directly inserted into the disc recording and/or reproducing apparatus after being taken out from the optical disc cartridge, or the optical disc cartridge can be inserted into the disc recording and/or reproducing apparatus under a state that the optical disc is accommodated in the optical disc cartridge. The process that the optical disc cartridge having the optical disc therein is operated in the disc recording and/or reproducing apparatus is the same as the aforementioned process.

An optical disc cartridge according to a second embodiment of the present invention will be explained as follows.

Figure 9:
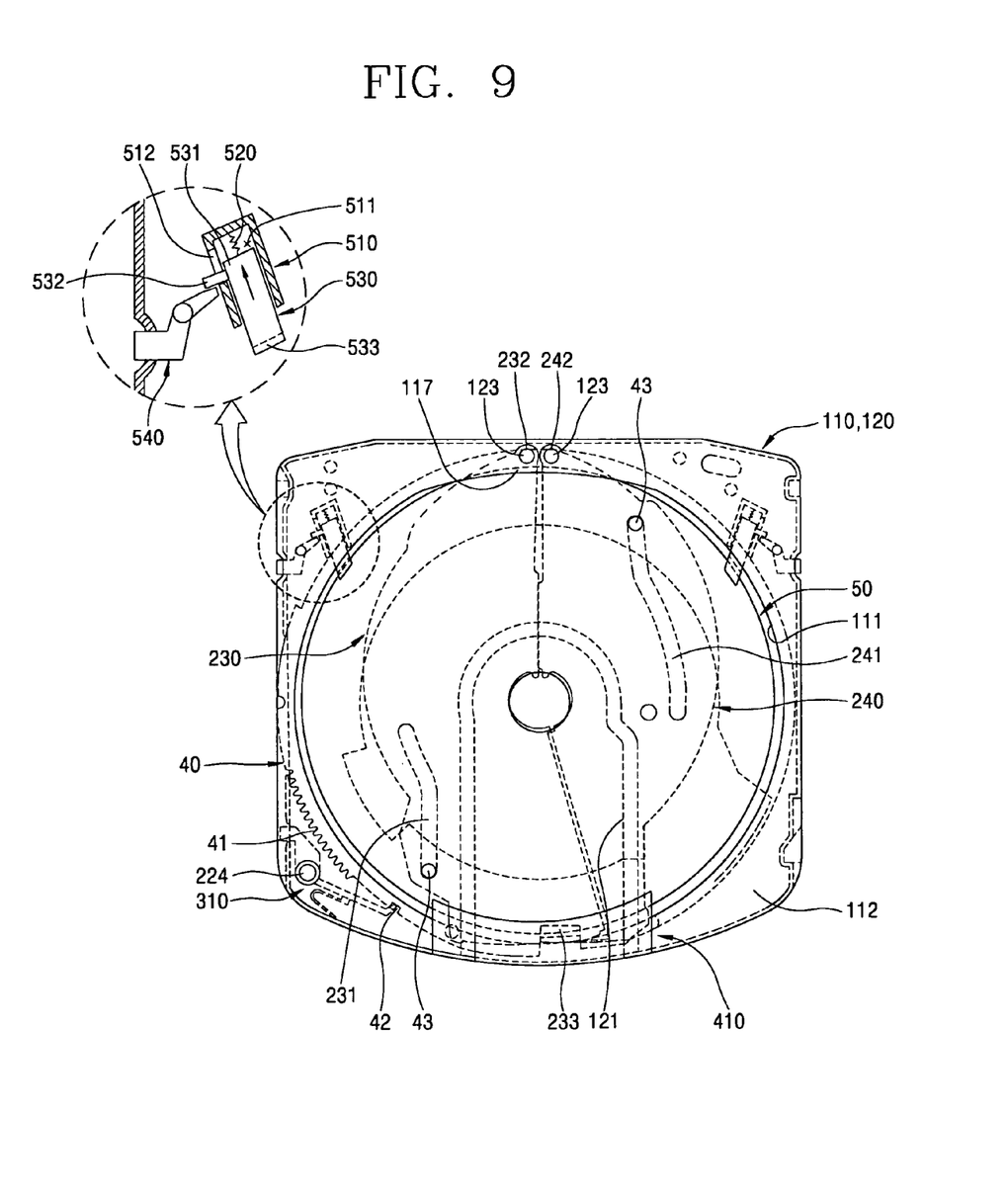
FIGS. 9 and 10 are respectively a plane view and a disassembled perspective view showing an optical disc cartridge according to a second embodiment of the present invention.
Figure 10:
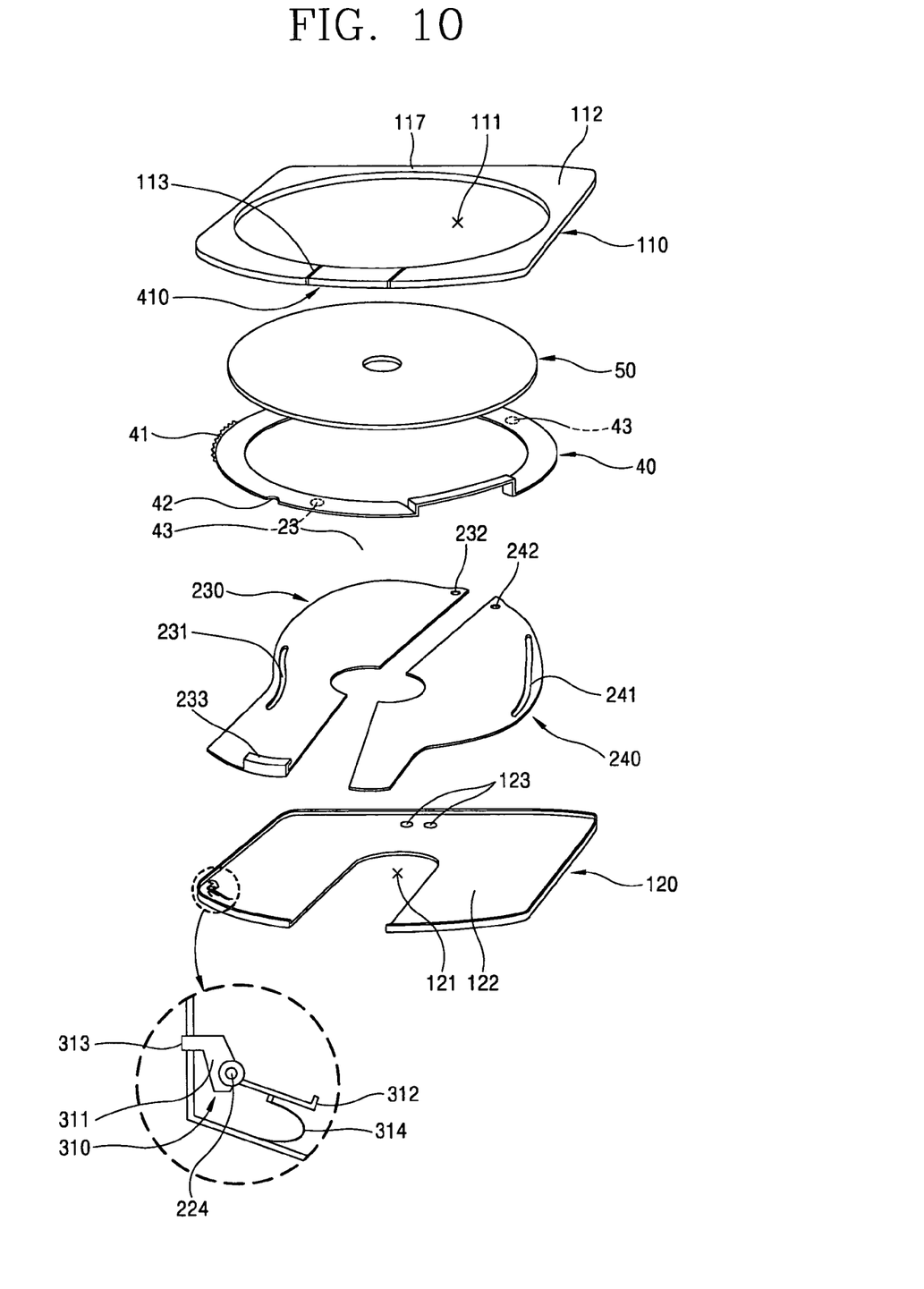

FIGS. 9 and 10 are respectively a plane view and a disassembled perspective view showing the optical disc cartridge according to the second embodiment of the present invention. The same reference numerals were given to the same parts as those of the conventional art.

As shown, the optical disc cartridge according to the second embodiment, like the optical disc cartridge according to the first embodiment of the present invention, comprises: a casing; a rotation wheel; left and right shutters; a wheel fixing/releasing means; and a disc fixing/releasing means. The casing is provided with one fixing protrusion formed at the left shutter and is provided with two disc supporting means for supporting the optical disc.

The casing, the rotation wheel 40, and the wheel fixing/releasing means have the same construction as those of the first embodiment thereby to omit detail explanations.

The left shutter 230 is provided with a cam groove 231 of a certain shape at a plate of a certain shape, and a hinge hole 232 for inserting the boss 12 is formed at one side of the plate. A fixing protrusion 233 is formed at an opposite position of the hinge hole 232. When compared to the conventional left shutter 20, the left shutter 210 of the present invention is not provided with the first fixing protrusion 23.

The right shutter 240 is provided with a cam groove 241 of a certain shape at a plate of a certain shape, and a hinge hole 242 for inserting the boss 123 of the lower case 120 is formed at one side of the plate. When compared to the conventional right shutter 30, the right shutter 240 of the present invention is not provided with the first fixing protrusion 33.

In a pair of the left shutter 230 and the right shutter 240, one fixing protrusion 233 is provided only at the left shutter 230. The fixing protrusion 233 can be formed at the right shutter 240.

The disc supporting means includes: a case 510 formed at the casing and provided with a sliding hole 511 having a certain sectional surface and of which one side is closed; a spring 520 inserted into the sliding hole 511; a disc supporting member 530 slidably inserted into the sliding hole 511 and elastically supported by the spring 520, for supporting the optical disc; and a pushing lever 540 rotatably coupled to the casing, for releasing a fixing of the optical disc by moving the disc supporting member 530.

The guide case 510 is formed by the upper case 110 and the lower case 120 constituting the casing.

The disc supporting member 530 is composed of: a body portion 531 having a sectional surface and a length corresponding to those of the sliding hole 511; a stopping portion 532 extendedly formed at one side of the body portion 531; and an inclination surface portion 533 contact-supported by the optical disc at one side end of the body portion 531. In the disc supporting member 530, the body portion 531 is inserted into the sliding hole 511 and the stopping portion 532 is inserted into a movement limiting slit 512 penetratingly-formed at one lateral wall of the guide case thereby to be protruded outwardly. The stopping portion 532 protruded outwardly is in contact with one side of the pushing lever 540.

One side of the pushing lever 540 is protruded to outside of the casing, and a part of the outer surface of the casing to which the pushing leer 540 is protruded is concaved.

Two disc supporting members are provided so as to support the optical disc 50 with one fixing protrusion 233 formed at the pair of shutters 230 and 240 with forming intervals of 120° one another in a state that the pair of shutters 230 and 240 close the access hole 121 of the casing.

Figure 11:
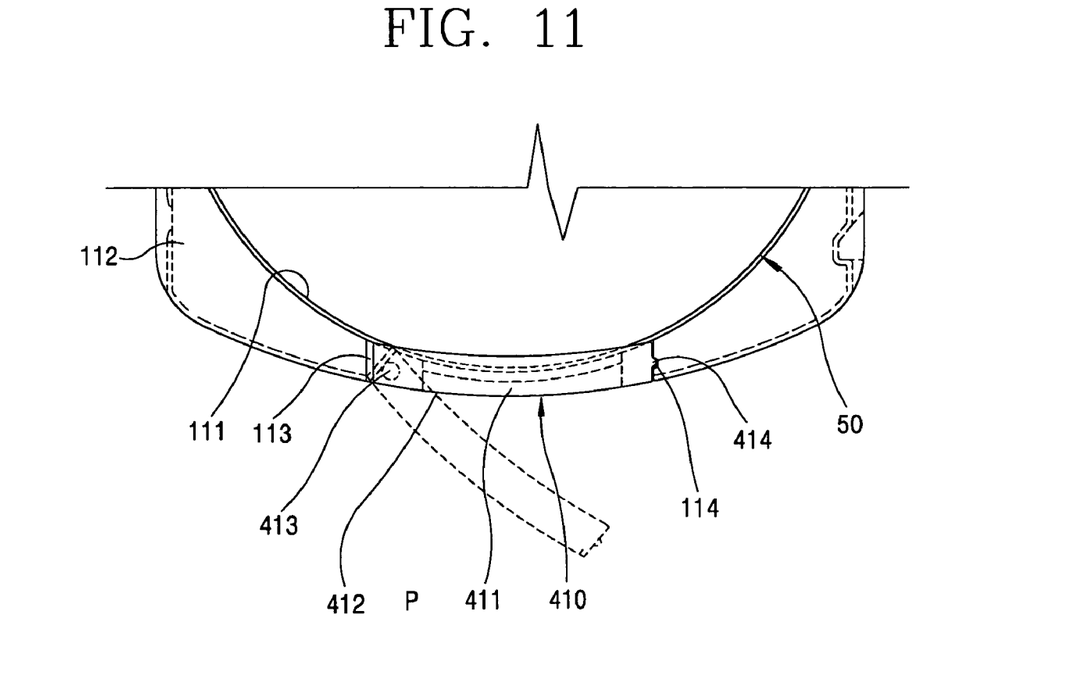
FIGS. 11, 12, and 13 show modification examples of a disc fixing/releasing means of the optical disc cartridge according to the second embodiment of the present invention.

The disc fixing/releasing means, as shown in FIG. 11, includes: a hinge type overlapping member 410 hinge-coupled to an upper surface of the casing and angle-rotated in a horizontal direction of the casing centering around a hinge axis thus to be overlapped with the disc inserting/opening part 111 of the casing, for decreasing a size of the disc inserting/opening part 111; and an attachment/detachment means for attaching/detaching another side of the hinge type overlapping member 410 to/from the casing 100. Said construction is the same as that of the first embodiment except that the hinge type overlapping member 410 is not provided with the supporting protrusion P. Operation of the disc fixing/releasing means is the same as the aforementioned one.

Figure 12:
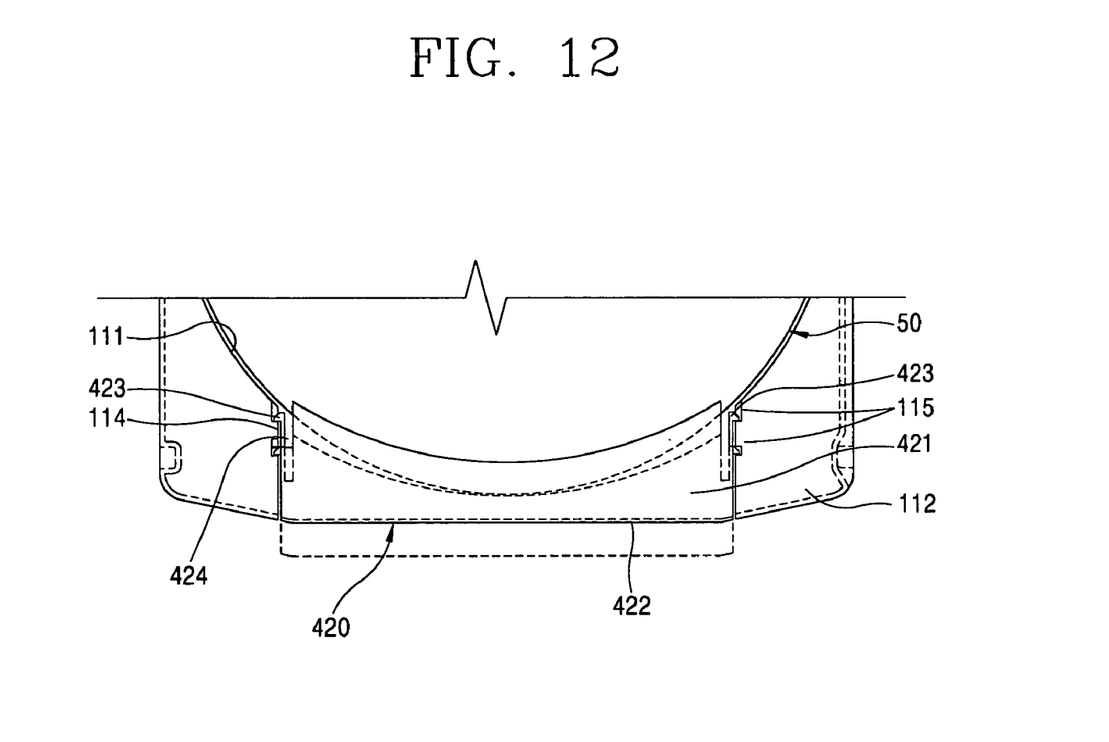

FIG. 12 shows a modification example of the disc fixing/releasing means. As shown, the disc fixing/releasing means includes: a reciprocating type overlapping member 420 reciprocably coupled to the upper surface of the casing in a direction towards the disc inserting/opening part 111 thus to be overlapped with the disc inserting/opening part 111, for decreasing a size of the disc inserting/opening part 111; and a position limiting means for limiting a reciprocation distance of the reciprocating type overlapping member 420. Said construction is the same as that of the first embodiment except that the reciprocating type overlapping member 420 is not provided with the supporting protrusion P. Operation of the disc fixing/releasing means is the same as the aforementioned one.

Figure 13:
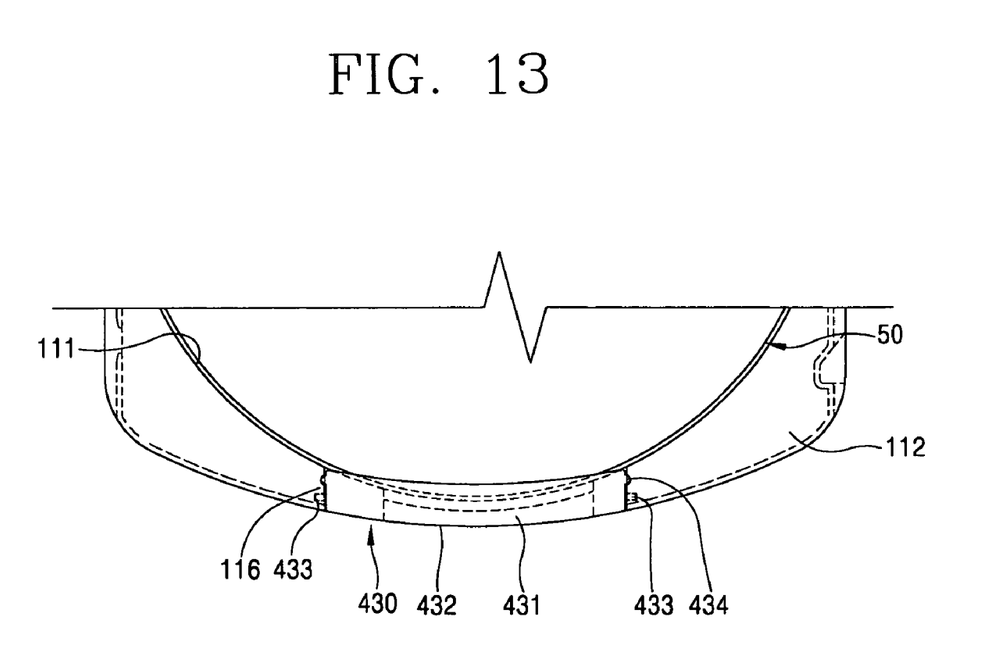

FIG. 13 shows another modification example of the disc fixing/releasing means. As shown, the disc fixing/releasing means includes: a rotary type overlapping member 430 hinge-coupled to the casing and angle-rotated in a vertical direction of the casing centering around a hinge axis thus to be overlapped with the disc inserting/opening part 111 of the casing, for decreasing a size of the disc inserting/opening part 111; and an attachment/detachment means for attaching/detaching one side of the rotary type overlapping member 430 to/from the casing 100. Said construction is the same as that of the first embodiment except that the rotary type overlapping member 430 is not provided with the supporting protrusion P. Operation of the disc fixing/releasing means is the same as the aforementioned one.

Operation of the optical disc cartridge according to the second embodiment of the present invention will be explained as follows.

In the optical disc cartridge of the present invention, differently from the conventional art in which the left shutter 230 and the right shutter 240 are moved by rotating the rotation wheel 40 in order to accommodate the optical disc 50 in the casing or to take out the accommodated optical disc 50 from the casing, the optical disc is accommodated in the casing or the accommodated optical disc is taken out from the casing in a state that the left shutter 230 and the right shutter 240 close the access hole 121.

In case of accommodating the optical disc in the casing, the disc fixing/releasing means is moved in a direction spaced from the disc inserting/opening part in a state that the pushing lever 540 of the disc supporting means is pressed thus to release the overlapping of the disc fixing/releasing means with the disc inserting/opening part 111 of the casing. Then, the optical disc is inserted into the casing through the disc inserting/opening part 111 thus to be positioned on the rotation wheel 40. The optical disc is positioned on the rotation wheel 40 by being inserted between the fixing protrusion 223 of the left shutter 230 and the upper surface of the rotation wheel 40.

According to this, the disc supporting member 530 is moved by being supported by the spring 520 and thus contact-supports the optical disc 50 positioned on the rotation wheel 40. Then, the disc fixing/releasing means is moved towards the disc inserting/opening part 111 thus to overlap the disc inserting/opening part 111. The optical disc 50 placed in the casing is supported at three points by the fixing protrusion 233 of the left shutter 230 and two disc supporting means.

Also, under a state that the fixing of the optical disc at three points is released by a user's carelessness, when the optical disc cartridge is moved, the disc fixing/releasing means is overlapped with the disc inserting/opening part 111 and thereby the size of the disc inserting/opening part 111 becomes small. According to this, the optical disc 50 is prevented from being detached from the casing through the disc inserting/opening part 111.

Also, in case of taking out the optical disc 50 accommodated in the casing, the pushing lever 540 of the disc supporting means is pressed thus to release the supported state of the optical disc by the disc supporting member 530. Under this state, the disc fixing/releasing means is moved in a direction spaced from the disc inserting/opening part 111 thus to release the overlapping of the disc fixing/releasing means with the disc inserting/opening part 111. Then, the user takes out the optical disc positioned on the rotation wheel 40 inside the casing through the disc inserting/opening part 111. At this time, the user takes out the optical disc positioned between the fixing protrusion 233 of the left shutter 210 and the upper surface of the rotation wheel 40.

In case of recording information in the optical disc or reproducing the information by using a disc recording and/or reproducing apparatus, the optical disc can be directly inserted into the disc recording and/or reproducing apparatus after being taken out from the optical disc cartridge, or the optical disc cartridge can be inserted into the disc recording and/or reproducing apparatus under a state that the optical disc is accommodated in the optical disc cartridge. The process that the optical disc cartridge having the optical disc therein is operated in the disc recording and/or reproducing apparatus is the same as the aforementioned process.

As aforementioned, in the optical disc cartridge according to the present invention, when the optical disc of a high density is to be accommodated in the optical disc cartridge or the accommodated optical disc is to be taken out from the optical disc cartridge, the optical disc 50 can be accommodated in the optical disc cartridge or taken out from the optical disc cartridge through the disc inserting/opening part 111 of the casing without separating the upper case 110 and the lower case 120 of the casing from each other.

Additionally, the optical disc can be accommodated in the optical disc cartridge or can be taken out from the optical disc cartridge without moving the pair of shutters for supporting the optical disc, thereby facilitating the operation and enhancing the user's convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical disc cartridge comprising:
   a casing having a disc inserting/opening part for inserting and taking out a disc at an upper surface thereof and having an access hole to which an optical pickup accesses at a lower surface thereof;
   a pair of shutters mounted in the casing, for opening and closing the access hole and contact-supporting a disc at two points or at one point;
   a rotation wheel rotatably coupled to the shutters, for moving the shutters and placing an optical disc thereon;
   a wheel fixing/releasing means mounted at an inner side of the casing, for fixing or releasing the rotation wheel; and a disc fixing/releasing means movably mounted at the casing, for controlling a size of the disc inserting/opening part and thereby limiting an insertion/takeout of an optical disc, wherein the disc fixing/releasing means is provided with a supporting protrusion for supporting the optical disc in case of decreasing a size of the disc, inserting/opening part by moving the disc fixing/releasing means towards the disc inserting/opening part.

2. The optical disc cartridge of claim 1, wherein the pair of shutters are provided with two fixing protrusions for supporting an optical disc at two points.

3. The optical disc cartridge of claim 2, wherein said each shutter is provided with one fixing protrusion, respectively.

4. The optical disc cartridge of claim 1, wherein the disc fixing/releasing means includes:
   a hinge type overlapping member hinge-coupled to the casing, angle-rotated in a horizontal direction of the casing centering around a hinge axis thus to be overlapped with the disc inserting/opening part, for decreasing a size of the disc inserting/opening part;
   the supporting protrusion protruded at a lower surface of the hinge type overlapping member; and
   an attachment/detachment means for attaching/detaching another side of the hinge type overlapping member to/from the casing.

5. The optical disc cartridge of claim 4, wherein the attachment/detachment means is composed of:
   a detachable protrusion formed at one side of the hinge type overlapping member; and
   an attachment/detachment groove formed at the case, for attaching/detaching the detachable protrusion thereto/therefrom.

6. The optical disc cartridge of claim 1, wherein the disc fixing/releasing means includes:
   a reciprocating type overlapping member reciprocably coupled to the casing in a direction towards the disc inserting/opening part thus to be overlapped with the disc inserting/opening part, for decreasing a size of the disc inserting/opening part;
   a the supporting protrusion protruded at a lower surface of the reciprocating type overlapping member; and
   a position limiting means for limiting a reciprocation distance of the reciprocating type overlapping member.

7. The optical disc cartridge of claim 6, wherein the position limiting means is composed of:
   a plurality of attachment/detachment grooves formed at the casing in a movement direction of the reciprocating type overlapping member; and
   a plurality of detachable protrusions protruded at both lateral walls of the reciprocating type overlapping member thus to be attached/detached to/from the attachment/detachment groove.

8. The optical disc cartridge of claim 1, wherein the disc fixing/releasing means includes:
   a rotary type overlapping member hinge-coupled to the casing, angle-rotated in a vertical direction of the casing centering around a hinge axis thus to be overlapped with the disc inserting/opening part, for decreasing a size of the disc inserting/opening part;
   the supporting protrusion protruded at a lower surface of the rotary type overlapping member; and
   an attachment/detachment means for attaching/detaching another side of the rotary type overlapping member to/from the casing.

9. The optical disc cartridge of claim 8, wherein the attachment/detachment means is composed of:
   attachment/detachment grooves formed at the case with a constant interval; and
   attachment/detachment protrusions formed at both lateral surfaces of the rotary type overlapping member thus to be attached/detached to/from the attachment/detachment grooves.

10. The optical disc cartridge of claim 1, wherein the disc fixing/releasing means is provided at one side of the casing to be positioned at the access hole side of the casing.

11. The optical disc cartridge of claim 1, wherein the pair of shutters are provided with one fixing protrusion for supporting the optical disc at one part, and include a plurality of disc supporting means movably provided at the casing for supporting the optical disc with the fixing protrusion.

12. The optical disc cartridge of claim 11, wherein the plurality of disc supporting means includes two disc supporting members.

13. The optical disc cartridge of claim 11, wherein each disc supporting means includes:
   a case formed at the casing and provided with a sliding hole of which one side is closed; a spring inserted into the sliding hole;
   a disc supporting member slidably inserted into the sliding hole and elastically-supported by the spring, for supporting the optical disc; and
   a pushing lever rotatably coupled to the casing, for releasing a fixing of the optical disc by moving the disc supporting member.

14. The optical disc cartridge of claim 1, wherein a stopping region is extendedly-formed at one side of the disc inserting/opening part and has a curvature radius of an inner circumferential surface thereof larger than that of the disc inserting/opening part.

15. The optical disc cartridge of claim 1, wherein the disc fixing/releasing means includes:
   a hinge type overlapping member hinge-coupled to the casing, angle-rotated in a horizontal direction of the casing centering around a hinge axis thus to be overlapped with the disc inserting/opening part, for decreasing a size of the disc inserting/opening part; and
   an attachment/detachment means for attaching/detaching another side of the hinge type overlapping member to/from the casing.

16. The optical disc cartridge of claim 15, wherein the attachment/detachment means is composed of: a detachable protrusion formed at one side of the hinge type overlapping member; and an attachment/detachment groove formed at the casing, for attaching/detaching the detachable protrusion thereto/therefrom.

17. The optical disc cartridge of claim 1, wherein the disc fixing/releasing means includes:
   a reciprocating type overlapping member reciprocably coupled to the casing in a direction towards the disc inserting/opening part thus to be overlapped with the disc inserting/opening part, for decreasing a size of the disc inserting/opening part; and
   a position limiting means for limiting a reciprocation distance of the reciprocating type overlapping member.

18. The optical disc cartridge of claim 17, wherein the position limiting means is composed of:
   a plurality of attachment/detachment grooves formed in a movement direction of the reciprocating type overlapping member; and
   a plurality of detachable protrusions protruded at both lateral surfaces of the reciprocating type overlapping member thus to be attached/detached to/from the attachment/detachment grooves.

19. The optical disc cartridge of claim 1, wherein the disc fixing/releasing means includes:
a rotary type overlapping member hinge-coupled to the casing, angle-rotated in a vertical direction of the casing centering around a hinge axis thus to be overlapped with the disc inserting/opening part, for decreasing a size of the disc inserting/opening part; and
an attachment/detachment means for attaching/detaching another side of the rotary type overlapping member to/from the casing.

20. The optical disc cartridge of claim 19, wherein the attachment/detachment means is composed of:
an attachment/detachment groove formed at the casing; and
a detachable protrusion protruded at both lateral surfaces of the rotary type overlapping member thus to be attached/detached to/from the attachment/detachment groove.

21. An apparatus of recording or reproducing data on or from an optical disc, comprising:
a driving unit rotating an optical disc inserted in the optical disc cartridge of claim 1; and
a recording or reproducing unit recording or reproducing data on or from the optical disc.

* * * * *